(12) United States Patent
Hlasny

(10) Patent No.: US 7,221,747 B2
(45) Date of Patent: May 22, 2007

(54) TELEPHONE PROVIDING AUTOMATIC TRACKING OF CALLING PLAN CHARGES

(75) Inventor: Daryl Hlasny, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 688 days.

(21) Appl. No.: 10/676,975

(22) Filed: Sep. 30, 2003

(65) Prior Publication Data

US 2005/0069112 A1 Mar. 31, 2005

(51) Int. Cl.
*H04M 15/00* (2006.01)
*H04M 11/00* (2006.01)

(52) U.S. Cl. ............ 379/130; 379/114.01; 379/121.02; 455/407; 455/419; 455/550.1

(58) Field of Classification Search ........ 455/406–408, 455/556.2, 419, 550.1; 379/114.01, 114.03, 379/114.09, 114.17, 121.02, 130
See application file for complete search history.

(56) References Cited

U.S. PATENT DOCUMENTS

| 4,264,956 A | 4/1981 | Delaney |
| 5,222,127 A | 6/1993 | Fukui |
| 5,689,476 A | 11/1997 | Leach |
| 7,120,928 B2 * | 10/2006 | Sheth et al. .................... 726/4 |
| 2002/0023057 A1 * | 2/2002 | Goodwin et al. ............. 705/50 |
| 2002/0151293 A1 * | 10/2002 | Tysor .......................... 455/406 |
| 2002/0193092 A1 * | 12/2002 | Bhogal et al. .............. 455/405 |
| 2002/0194226 A1 * | 12/2002 | Sheth et al. ................. 707/517 |
| 2003/0045266 A1 * | 3/2003 | Staskal et al. .............. 455/405 |
| 2004/0209595 A1 * | 10/2004 | Bekanich .................... 455/405 |
| 2004/0218748 A1 * | 11/2004 | Fisher .................... 379/221.01 |

FOREIGN PATENT DOCUMENTS

| GB | 2 269 074 | 1/1994 |
| KR | 9302131 | 3/1993 |
| WO | WO 97/25805 | 7/1997 |

* cited by examiner

*Primary Examiner*—Binh K. Tieu
(74) *Attorney, Agent, or Firm*—Madson & Austin

(57) ABSTRACT

The invention is directed to a telephone that provides for automatically and accurately tracking calling plan charges using carrier plan rules, for informing a user of accrued charges on request, and for providing messages and signals to a user so that the user may budget telephone use and thereby lower the user's costs.

48 Claims, 2 Drawing Sheets

TELEPHONE PROVIDING AUTOMATIC TRACKING OF CALLING PLAN CHARGES

FIELD OF THE INVENTION

The present invention relates to a telephone providing automatic tracking of calling plan charges, and more particularly to a cellular telephone providing automatic tracking of cellular carrier calling plan charges.

BACKGROUND

Mobile telephones for use in radiotelephone networks ("cellular telephones") are in widespread use, and cellular telephone calling plans define how much a user is charged for the use of a cellular telephone. The billing rules of cellular telephone calling plans can be complex. For example, a typical calling plan provides for a fixed number of minutes over a given period of time, such as a month, for a flat fee. In addition, the calling plan typically provides that calls must be made from or received within a specific geographic area or areas ("calling area"). Additional charges may be assessed for minutes in excess of the fixed number of minutes, for calls from outside of the calling area ("roaming calls"), for calls to numbers outside of the calling area ("long distance calls"), and for calls made on particular days of the year or week, or at a particular time of day. In addition, a calling plan may count the time required to make a connection as part of the call's duration and may round up the duration of the call to a whole number of minutes. Further, some calling plans do not count the first minute of a call when computing call duration. Other plans provide different rules depending on whether a call is incoming or outgoing. Moreover, some plans permit allocated minutes to be carried over from one billing period to the next. In addition, some calling plans cover the use of two or more telephones under a single plan ("shared minutes"). A calling plan may have many combinations and permutations of a large number of the limitations and conditions mentioned above.

A user may wish to accurately track these charges and thereby budget his use of the cellular telephone. Some cellular telephones include a cumulative call timer that keeps a continuous record of phone use since the last time the timer was reset. However, for the purpose of budgeting cellular telephone expenses, the cumulative call timer has significant limitations. Because there may be no charge for the first minute of a call, the cumulative call timer may start accruing time too early. On the other hand, because the time period of the call may include the time required for a connection to be established, the cumulative call timer may start accruing time too late. The cumulative call timer may not easily be used to estimate the cost of a call because the rate of charge applied to the particular call may depend on the sum of the duration of all similar calls previously made in the billing period, that is, whether the fixed number of minutes in the calling plan have been exceeded. In addition, the cumulative call timer does not account for the caller's location or the number called and, as mentioned above, these factors may affect the charge rate. Further, in order to estimate the number of minutes used during a billing period, the cumulative call timer must be reset at the start of each new billing cycle. This requires the user to remember this date and manually reset the call timer. This is inconvenient and not commonly performed. In addition, a calling plan may provide for unused minutes to be carried over into the next billing period and the cumulative call timer cannot carry over minutes. For these reasons, the cumulative call timer generally does not provide a means for accurately estimating cellular telephone usage charges. Thus, it is often not practical, and in some cases not possible, for a cellular telephone user to track these charges and thereby budget use of the cellular telephone.

Accordingly, there is a need for a cellular telephone that provides automatic tracking of cellular carrier charges so that a user of the cellular telephone may budget the use of the cellular telephone and thereby lower the user's costs.

SUMMARY OF THE INVENTION

The invention is directed to a telephone that provides for automatically and accurately tracking calling plan charges using carrier plan rules. Preferably, the telephone comprises a call timer and a call time controller. For a call made or received with the telephone, the time controller is adapted for: (a) receiving a set of charge parameters and time information; (b) identifying a first charge parameter from said set of charge parameters that pertains to a first period of said duration by use of said time information; (c) causing said call timer to accumulate time over said first period; (d) receiving a predetermined time corresponding to the time of termination of a billing period; and (e) resetting said call timer at said predetermined time according to said time information.

DETAILED DESCRIPTION

Figure 1:
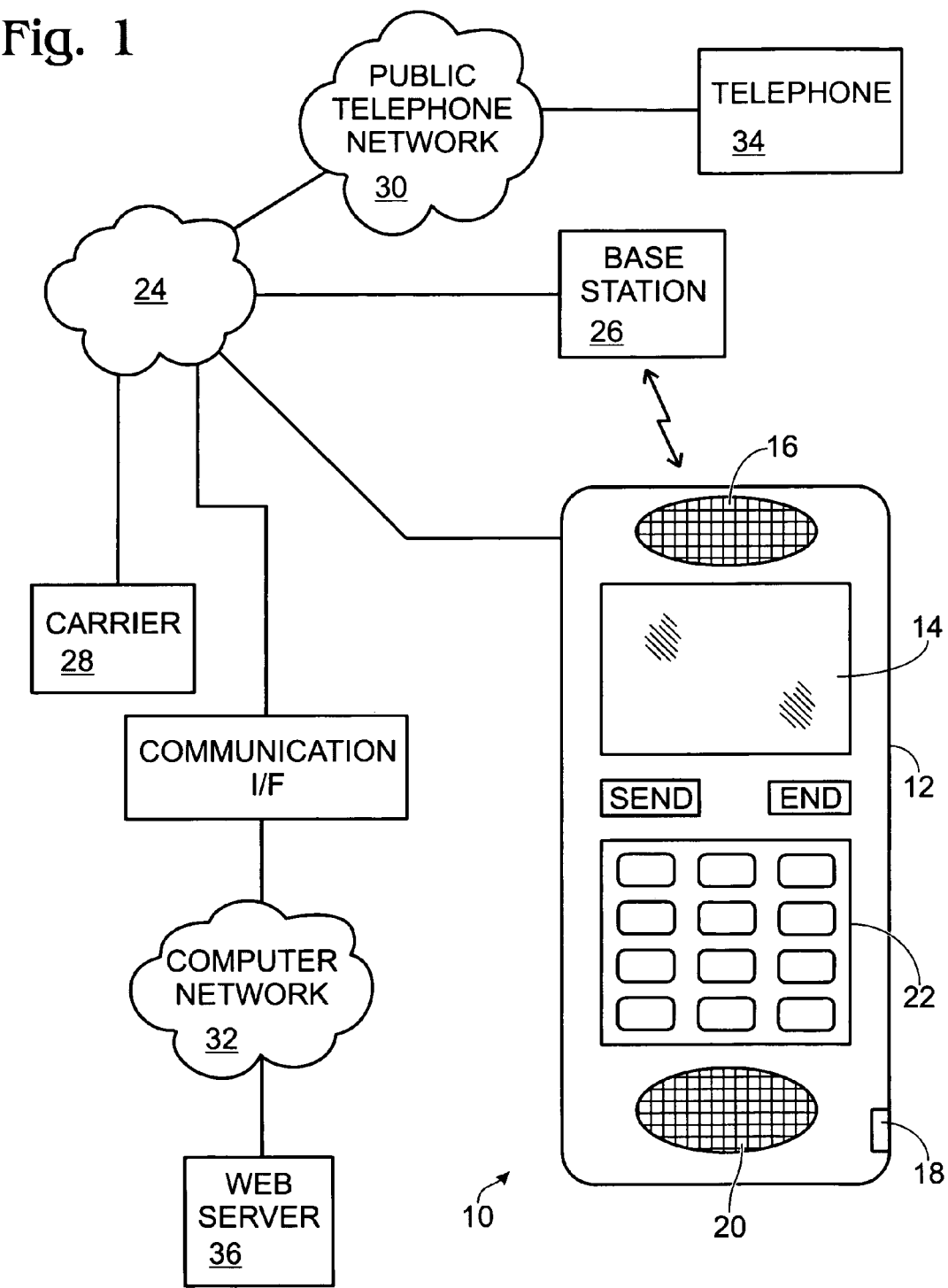
FIG. 1 is a pictorial view of a cellular telephone, and related infrastructure, providing automatic tracking of cellular carrier charges according to the present invention.

FIG. 1 shows a cellular telephone 10 that automatically tracks cellular telephone charges using carrier plan rules according to the invention. The cellular telephone 10 has a housing 12 that supports a display 14, a speaker 16, a dataport 18, a microphone 20, and a keypad 22. Typically, using the keypad 22, the cellular telephone 10 is coupled wirelessly to another telephone 34 (or less typically to a website) through a base station 26, which in turn is coupled to telephone switches 24 that provides connections to the public telephone network 30 or a computer network 32, such as the Internet, commercial cellular telephone carrier, although the principles of the invention also apply to telephones coupled to wired telephone networks.

The cellular telephone carrier 28 ("carrier") tracks the charges for the cellular telephone 10 based on the rules of one of its calling plans and the charges are generally assessed on a periodic basis, such as monthly. The charges are based on application of carrier plan rules to calls occurring within a particular time period ("billing period"). The principles of the invention may be illustrated with reference to the simple Exemplary Calling Plan A described below:

Exemplary Calling Plan A

1. Billing Period.

In this example of a carrier calling plan, the "billing period" is one calendar month, and is defined to begin at 12:00 AM on the first day of each month, and to end at 11:59:59 PM on the last day of the month.

2. Calling Period.

The exemplary calling plan has just one calling period. The single calling period is defined to begin and end each day at 12:00 AM and 11:59:59 PM, respectively.

3. Call Duration.

The carrier 21 assigns each call a "call duration" according to the calling plan rules. The Exemplary Calling Plan A defines call duration using a "call begin time" and a "call end time." The call begin time is the time when the user presses a button on the cellular telephone, such as a send button, and the call end time is the time when the user presses another button, such as an end button. Thus, the time duration of a call begins notwithstanding, for example, that the other telephone may not start ringing for 10–15 seconds, and may not be answered until it has rung several times, an additional 10–15 seconds later. Further, in this example, the calling plan rounds upwards the duration of each call into a whole number of minutes. As an illustration, the send button is pressed and 15 seconds later the called telephone begins to ring. The call is answered ten seconds later. The parties then speak for 36 seconds before disconnecting. The elapsed time from pressing send to disconnecting is 61 seconds. Rounding up, the calling plan assigns 2 minutes for the duration of this call. For simplicity of this explanation, calls to the cellular telephone are treated the same as calls from the cellular telephone in this Exemplary Calling Plan A.

4. Rates of Charge.

In this example, the calling plan provides that for a fixed fee, the duration of calls occurring during the single calling period may sum up to 100 minutes during the billing period. To the extent that the calls sum up to more than 100 minutes during a billing period, an additional charge is assessed on these calls at $0.50/minute. The number of minutes provided for a fixed fee is referred to herein as "base" minutes.

Figure 2:
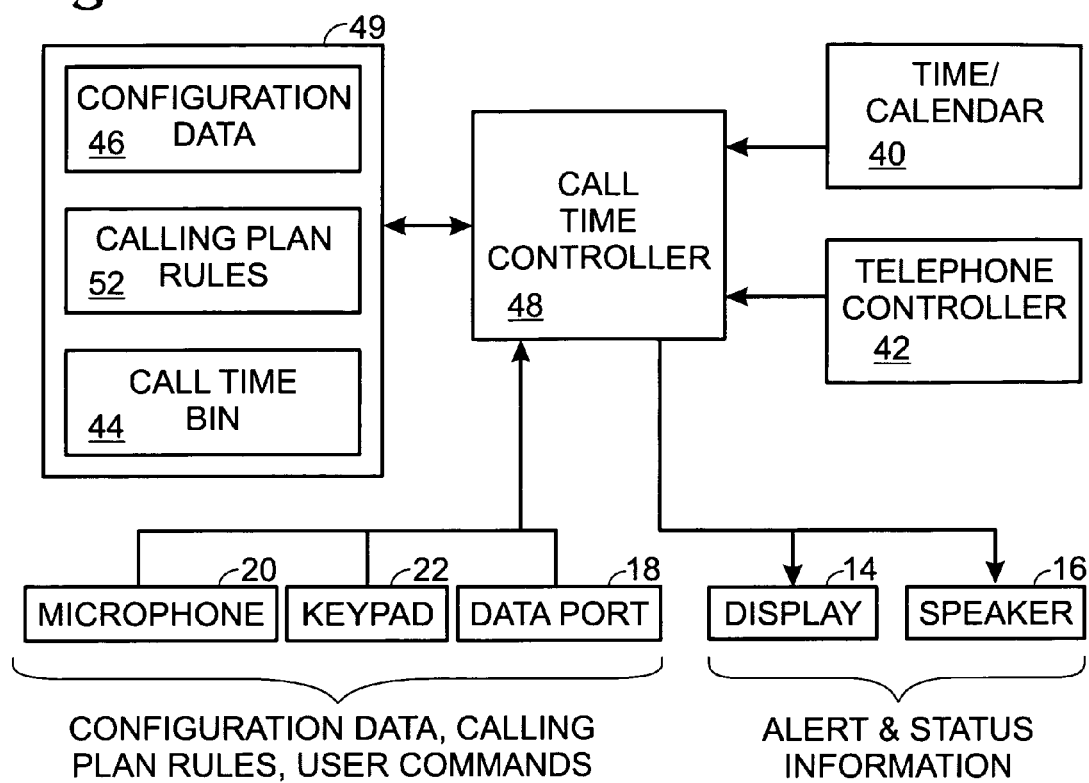
FIG. 2 is a block diagram of the cellular telephone of FIG. 1 showing selected features, including a call time controller and a call time bin, according to the present invention.

FIG. 2 is a block diagram of selected portions of the cellular telephone 10 that are pertinent to the present invention. The cellular telephone 10 includes a time/calendar block 40, a telephone controller 42, at least one call time bin 44, configuration data 46, and a call time controller 48. In addition, the display 14, speaker 16, data port 18 microphone 20, keypad 22, and a memory 50 are shown schematically. Preferably, the cellular telephone 10 includes a plurality of time bins 44a, 44b, 44c, . . . 44n.

The call time controller 48 is an execution engine that receives time and date information from the time/calendar block 40 and information about the occurrence of calls from the telephone controller 42. In addition, the call time controller 48 accesses the information stored in call time bin 44, configuration data 46, and calling plan rules 52. Preferably, the call time controller 48 uses this information to modify the value stored in call time bin 44 and to create status and alert messages and signals, which it sends to the display 14 or the speaker 16.

The telephone controller 42 provides functions for generally controlling the cellular telephone 10. In addition, when a call occurs, the telephone controller 42 signals the call time controller 48 that a call has been initiated (or received), and provides additional information to the call time controller 48 about the call. For example, the telephone controller 42 may provide the call time controller 48 with the following: call start time, call end time, call type, (i.e., whether originated or received, and whether roaming or non-roaming), and the telephone number of the connected telephone. Further, the telephone controller 48 may provide other or different call information as required.

The time/calendar block 40 is adapted to provide the call time controller 48 with time and date information relevant to the carrier's calling plan. Such information may include the day of the month, the day of week, and the time of the day. Other or different time and date information may be provided as required. While the time/calendar block 40 may be a hardware device or software within the cellular telephone 10, the functions of the time/calendar block 40 may also be provided from a source outside of the cellular telephone. In one preferred embodiment, a time signal is periodically obtained from the carrier so that the time/calendar block 40 provides time information that is synchronized with the time information that the carrier is using to determine charges. In addition, in one preferred embodiment, the time information provided by the time/calendar block 40 is used to determine the duration of a call or the durations of a portion of a call occurring during a calling period.

Calling plan rules 52 and configuration data 46 may be stored in the memory 49. Configuration data 46 refers generally to user specific information such as the first day of the user's billing period, the number of base minutes, closed group telephone numbers, and other similar information. Configuration data 46 may be entered directly by the user via the keypad 22 or transferred from a computing device via data port 18 or a data connection over the cellular network to the base station 26. The carrier's calling plan rules 52 may also be entered directly, but preferably the rules are transferred from a computing device or a website. Configuration data 46 and calling plan 52 rules may be imported into the memory 49 using any method known in the art. Exemplary methods include SMS, Bluetooth, IrDA, or a serial cable, such as a USB cable, coupled to an appropriate computing device. SMS is an acronym for Short Message Service and defines a protocol that permits a short message to be sent to a GSM (Global System for Mobile communications) cellular telephone. Bluetooth is a standard for short-range wireless communication between computing devices which provides an "object push" protocol for sending a data object to a Bluetooth device. IrDA is a specification for wirelessly transferring data via infrared radiation. USB refers to the Universal Serial Bus specification, a popular standard for coupling peripheral devices to computers.

In one alternate preferred embodiment, the keypad 22 is used to connect the cellular telephone 10 to a website provided by a webserver 36 where at least one calling plan, and preferably numerous calling plans are listed and identified by an icon or other identifier. Again using the keypad 22, a calling plan may be selected by clicking on the icon or in some other similar manner. The effect of selecting the calling plan icon is that the associated rules for the calling plan are automatically imported into the cellular telephone 10.

The cellular telephone 10 includes a call time bin 44, which is associated with the single calling period of the exemplary calling plan A. Preferably, a call time bin 44, is associated with each calling period in a calling plan. Since a particular calling plan may have a plurality of calling periods, the invention contemplates a plurality of call time bins 44. The call time bin 44 may be implemented as a data structure in memory 50. Preferably, the call time bin 44 is used to accumulate the duration of all calls that occur during the single calling period. In one preferred embodiment, the call time controller 48 may read or write to the call time bin 44.

In a preferred embodiment, the call time controller 48 resets the call time bin 44 to an initial value of zero minutes at the start of a billing cycle. The term "reset" is used herein to describe an operation in which the call time controller 48 writes an initial value to a call time bin 44. Each time a call is made, the call time controller 48 reads the value stored in the call time bin 44, adds the duration of the current call to the value read, and stores the sum in the call time bin 44. In an alternative preferred embodiment, the call time bin 44 is reset to the number of base minutes in the calling plan and the number of minutes is reduced each time a call occurs.

Operation of a preferred embodiment of the invention may be illustrated through an example with reference to Exemplary Calling Plan A. The call time controller 48 receives time and date information from the time/calendar block 40 indicating that a billing period has ended. The call time controller 48 resets the call time bin 44 to zero. Subsequently, throughout the billing period, the call time controller 48 receives information about the occurrence of calls from the telephone controller 42. The telephone controller 42 provides the call start time and call end time of each call. In one preferred embodiment, the call time controller 42 calculates the call duration of each call from the call start time and end time, and since all calls fall in the single calling period, adds each duration to the call time bin 44. In an alternative preferred embodiment, the call time controller 48 uses time information provided by the time/calendar block 40 to determine the duration of a call occurring during a calling period. When a predetermined number of base minutes remain, the call time controller 48 sends a message to the display 14 alerting the user of the number of base minutes remaining. For example, when ninety based minutes have been used, the call time controller 48 alerts the user that ten minutes remain. Moreover, when all of the base minutes have been used, the call time controller 48 alerts the user that all one hundred base minutes have been used by sending a message to the display 14 and a signal to the speaker 16. For instance, the speaker 16 may produce a distinctive ring. At any time, during the billing period, the user may request the number of base minutes remaining using the keypad 22, the microphone 20, or data port 18, and the call time controller 48 displays the minutes remaining. In embodiments which include a plurality of call time bins 44, the number of base minutes remaining in each bin may be displayed. Further, for minutes in excess of the base minutes, the call time controller 48 computes the cost using calling plan rules and provides this cost information in response to a user command. At the end of the billing period, the time/calendar block 40 sends a message to the call time controller 48, which in turn resets the call time bin 44 to an initial value.

Other aspects of the invention may be illustrated with reference to the Exemplary Calling Plan B:

Exemplary Calling Plan B

Exemplary Calling Plan B is identical to Exemplary Calling Plan A, except for the following:
 1. Calling Period.

Exemplary Calling Plan B has two calling periods. Each week is divided into weekdays (Monday through Friday) and weekends (Saturday and Sunday), and each day is divided into "day" and "evening" time periods. Weekends begin at 6:00 AM Saturday and end at 6:00 AM on Monday; evenings begin at 9:00 PM and end at 6:00 AM on the next day. The first calling period ("weekday calling period") occurs during the day on a weekday and the second time period ("evening/weekend calling period") occurs during the evening on a weekday or during the weekend.
 2. Call Duration. The call duration is the same as in Calling Plan A, except that the first minute is subtracted from the duration of all initiated calls.
 3. Rates of Charge.

A different rate of charge is applied for each calling period. The Exemplary Calling Plan B provides that for a fixed fee, calls occurring during the weekday calling period may sum up to 400 minutes during the billing period. In addition, calls occurring during the evening/weekend calling period may sum up to any number of minutes without limit. To the extent that calls occurring during the weekday calling period exceed the 400 base minutes during a billing period, an additional charge is assessed on these calls at $0.50/minute. The duration of a call that overlaps the two calling periods is apportioned between the two calling periods.
 4. Carry Forward of Base Minutes.

In the event that the billing period ends and at least one of the 400 base minutes in the weekday calling period have not been used, then the unused base minutes are carried over into the next billing period. However, no more than 100 base minutes may be carried over from a preceding period into a subsequent period. For example, at the end of the billing period, the user has 130 unused base minutes. In the next billing period, the user will have 400 base minutes plus 100 carry over base minutes, for a total of 500 base minutes.

Figure 3:
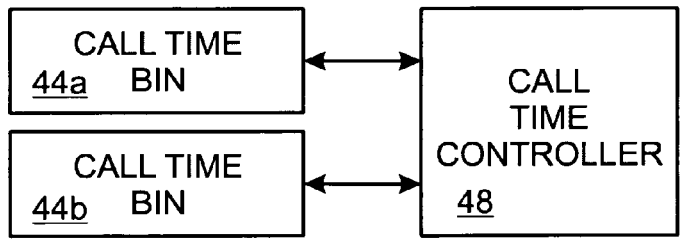
FIG. 3 is a block diagram of an alternative preferred embodiment showing a plurality of call time bins.

With reference to Exemplary Calling Plan B and the alternative preferred embodiment of FIG. 3, the cellular telephone 10 includes a call time bin 44 for each calling period, that is, a call time bin 44a is provided for the weekday calling period and a call time bin 44b is provided for the evening/weekend calling period. During the billing period and according to the calling plan rules, the call time controller 48 is adapted to cause the call time bin 44a to accumulate the duration of each call that occurs during the weekday calling period. Similarly, the call time controller 48 is adapted to cause the call time bin 44b to accumulate the duration of each call that occurs during the evening/weekend calling period.

As an example of how the rules of the Exemplary Calling Plan B work, consider the following call. The call is initiated by the user on a Tuesday. The call begins at 8:55 PM and ends at 9:05 PM. The call time controller 48 recognizes that the call start time is in the weekday calling period, but that the call end time is in the weekend/evening calling period. In addition, the call time controller 48 recognizes the first minute is to be subtracted from the duration of all initiated calls. Thus, the call time controller 48 is adapted to add four minutes to the call time bin 44a, and to add five minutes to call time bin 44b.

A calling plan may cover two cellular telephones. For example, the calling time provided in Exemplary Calling Plan B may be used on either of two cellular telephones for an additional monthly fee. In this case, the number of base minutes in the weekday calling period may be used in any combination by either of the telephones. In order for the call time controller 48 to be able to provide messages and alarms with respect to the number of base minutes remaining, the call time bin 44 in each telephone must be maintained in synchronicity. To accomplish this, the call time controller 48 may cause a message to be sent to the other telephone after each telephone call or on a periodic basis, such as daily or each time a telephone is powered-up. Alternatively, the call time bin 44 is maintained on a webserver or other remote memory location and each telephone interacts with call time bin 44 by sending commands to the remote location.

Turning now to an alternative preferred embodiment, the charge for any given minute is referred to herein as the "charge parameter" for that minute. For instance, in the Exemplary Calling Plan B, the charge parameter for a call occurring during the evening/weekend calling period is always zero, while the charge parameter for a call occurring during the weekday calling period is variable, depending on whether the base minutes have been exceeded. Integrating the charge for each minute over the total number of minutes in a given period accumulates charges for that period.

Figure 4:
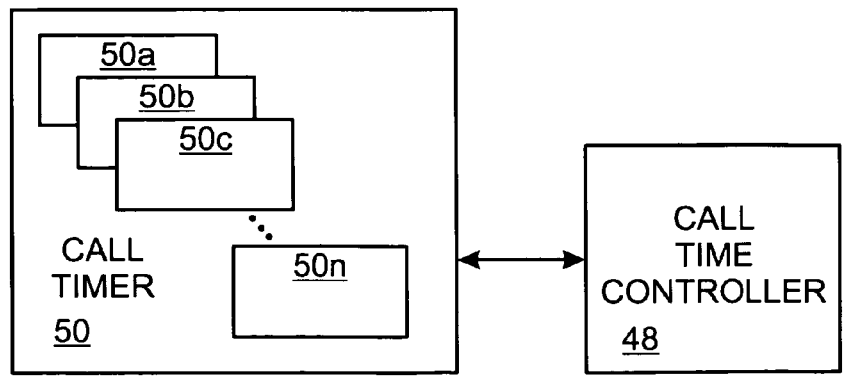
FIG. 4 is a block diagram of an alternative preferred embodiment of the call time controller of FIG. 2.

Referring to FIG. 4, the alternative preferred embodiment employing charge parameters is shown. The cellular telephone 10 includes a call timer 50. In this embodiment, the call timer 50 is used to accumulate the time associated with a particular charging parameter. Preferably, the call timer 50 is apportioned into multiple bins 50a, 50b, 50c, . . . 50n that correspond to "n" different charge parameters. In the example call given above, where two charge parameters are required to define the total cost of the call, a first call timer bin 50a would accumulate the time for the first 5 minute period from 8:55 PM to 9:00 PM for which charges are determined by the first charge parameter (and the calling rule providing that the first minute is subtracted from the duration of all initiated calls), and a second call timer bin 50b would be used to accumulate the time for the second 5 minute period from 9:00 PM to 9:05 PM for which charges are determined by the second charge parameter.

The call time controller 48 receives the aforementioned time information, e.g., from the time/calendar block 18, call information from the telephone controller 24, and carrier rules from the memory 49. For a received telephone call having given call information, preferably a first call timer bin 50a associated with the first minute of call time is instructed to start counting minutes and therefore to begin accumulating time. For this first minute, the call timer controller 48 determines a first charge parameter, and the call timer bin 50a is therefore associated with the first charge parameter. Minutes are permitted by the call timer controller 48 to accumulate in the call timer bin 50a until a second minute is reached for which the charge parameter changes to a second charge parameter. At the commencement of the second minute, the first call timer bin 50a is instructed to stop counting minutes and therefore to stop accumulating time, and a second call timer bin 50b associated with the second charge parameter is instructed to begin counting minutes. This process continues for as many charge parameters as are required to define the charges for the call. Each call timer accumulates time to which one charge parameter applies. At any time, the call timer controller 48 may calculate the total accrued charges by integrating the charge parameters over the time stored in the call timer. In this example, the call timer controller 48 reads the total accumulated times in the various call timer bins and multiplies those times by the respective charge parameter applicable to that bin.

Alternatively, the call timer 50 is not apportioned into bins. At the passage of each minute, the call controller 48 may compute and store in a memory the charge parameter for that minute. The call timer controller 48 may then integrate the charge parameters in the memory over the time accumulated in the call timer 50 simply by adding the contents of the memory. Any other desired means for integrating the product of the time and the cost associated with that time may be used without departing from the principles of the invention.

It is an outstanding feature of the invention that the call timer 50 is, and the call timer bins 50a, 50b, . . . 50n are, reset to zero, the number of carryover minutes, or other appropriate value at the end of the carrier's billing period. Without this feature, the user has no way of accounting for carrier calling plans that provide a particular number of base minutes. To provide this reset feature, the information imported into the memory 49 includes a predetermined time corresponding to the end of the billing period. This may be provided in the form of specific dates and times of day, or it may be provided in the form of a general rule from which the end of a billing period may be calculated from the time information. The call timer 50 is preferably reset when the time information indicates that the billing period ending time has been reached.

The call timer controller 48 preferably automatically displays the accumulated total cost as they are accrued for each call timer bin. Additional display functions may be provided as selected by the user, such as displaying the cost of the last call, displaying the cost of the current call as it is being accrued, or displaying the charging rate that would apply to a call if the call is initiated right now. Additionally, the call timer controller 48 may be adapted to send an alarm to the display 14 or speaker 16 when a calling period or charge parameter changes, or when the billing period is reset, or sufficiently prior to such times that the user can take action. For example, it may be desirable to program the cellular telephone 10 so that it sounds an alarm 5 minutes prior to the time that the charge parameter will increase, or at the time that the billing period is reset so that the user knows that base or carry over minutes have now been added to his or her account.

It will be readily apparent to one skilled in the art that many variations and additional rules are included actual calling plans over those described in the foregoing examples. For example, calls to a cellular telephone may be treated differently than calls from a cellular telephone in a particular calling plan. The Exemplary Calling Plans described herein are used only to illustrate the invention and are not intended to limit the scope of the invention in any way. It is to be recognized that, while preferred methods and apparatus according to the present invention have been shown and described, other methods and apparatus incorporating one or more of the features described herein may be employed without departing from the principles of the invention.

The terms and expressions which have been employed in the foregoing specification are used therein as terms of description and not of limitation, and there is no intention in the use of such terms and expressions to exclude equivalents of the features shown and described or portions thereof, it being recognized that the scope of the invention is defined and limited only by the claims which follow.

The invention claimed is:

1. A telephone providing automatic tracking of calling plan charges, comprising:

at least one time bin; and a call time controller adapted for:

(a) receiving a set of calling plan rules defining a billing period and at least one calling period, wherein the set of calling plan rules are transmitted from a server or other computing device to the call time controller in response to selection of an icon or other identifier representing the set of calling plan rules, (b) receiving time information and call occurrence information, (c) identifying at least one calling period associated with each call, and (d) determining the call duration for a call according to said set of calling plan rules.

2. The telephone of claim 1, wherein said telephone is a cellular telephone having a display and a speaker supported by a housing.

3. The telephone of claim 2, wherein the calling plan allows during the billing period a base number of minutes for use during said first calling period, and said call time controller being further adapted to display an unused number of base minutes.

4. The telephone of claim 3, wherein said call time controller is further adapted to sound an alarm when a predetermined number of unused base minutes remain in a billing period.

5. The telephone of claim 3, wherein said call time controller is further adapted to display the number of minutes used in excess of the base minutes allowed in a billing period.

6. The telephone of claim 5, wherein said call time controller is further adapted to calculate accrued cost of calls at any time during a billing period according to the calling plan rules and display said cost.

7. The telephone of claim 2, wherein said call time controller is further adapted to receive a predetermined time corresponding to the time of termination of a billing period, and to reset said at least one time bin according to the calling plan rules.

8. The telephone of claim 7, wherein said call time controller resets said at least one time bin to the number of unused base minutes in a preceding billing period.

9. The telephone of claim 2, wherein said call time controller is further adapted to determine the call duration of each call by subtracting a particular time from the duration according to the calling plan rules.

10. The telephone of claim 2, wherein said call time controller is further adapted to determine the call duration of each call by rounding a particular time up to the whole number of minutes according to the calling plan rules.

11. The telephone of claim 2, wherein the calling plan defines a plurality of calling periods, and wherein the telephone further comprises a plurality of time bins.

12. A telephone providing automatic tracking of calling plan charges, comprising:

a call timer; and a call time controller, wherein, for a call made or received with the telephone, said call having a duration, said time controller is adapted for:

(a) receiving a set of charge parameters and time information, wherein the set of charge parameters are defined at least in part by a set of calling plan rules transmitted from a server or other computing device to the call time controller in response to selection of an icon or other identifier representing the set of calling plan rules, (b) identifying a first charge parameter from said set of charge parameters that pertains to a first period of said duration by use of said time information, (c) causing said call timer to accumulate time over said first period, (d) receiving a predetermined time corresponding to the time of termination of a billing period, and (e) resetting said call timer at said predetermined time according to said time information.

13. The telephone of claim 12, wherein said call time controller is further adapted for computing an accumulated charge for said call by integrating said first charge parameter over said first period.

14. The telephone of claim 13, further comprising a display supported by a housing for the telephone, for displaying the computed accumulated charge.

15. The telephone of claim 12, wherein said call time controller is further adapted for identifying a second charge parameter from said set that pertains to a second period of said duration by use of said time information, and causing said call timer to accumulate time over said second period.

16. The telephone of claim 15, wherein said call time controller is further adapted for computing an accumulated charge for said call by integrating said first charge parameter over said first period, integrating said second charge parameter over said second period, and adding the result.

17. The telephone of claim 16, further comprising a display supported by a housing for the telephone, for displaying the computed accumulated charge.

18. The telephone of claim 15, wherein said call timer is apportioned into first and second call time bins, wherein said call time controller causes said first call timer bin to accumulate time over said first period and not said second period, and wherein said call timer controller causes said second call timer bin to accumulate time over said second period and not said first period.

19. The telephone of claim 12, wherein said call time controller is further adapted to reset said call timer to zero at said predetermined time.

20. The telephone of claim 12, wherein said call time controller is further adapted to reset said call timer to the number of base minutes at said predetermined time.

21. The telephone of claim 12, wherein said call time controller is further adapted to reset said call timer to the number of carryover minutes at said predetermined time.

22. The telephone of claim 12, further comprising a speaker supported by a housing for the telephone, for sounding an alarm on the occurrence of a predetermined condition.

23. The telephone of claim 22, wherein said predetermined condition is the end of the billing period.

24. The telephone of claim 22, wherein said predetermined condition is that a predetermined number of base minutes remain.

25. The telephone of claim 22, wherein said predetermined condition is that said first charge parameter is no longer applicable.

26. The telephone of claim 12, wherein said telephone is a cellular telephone.

27. A method for automatically tracking charges according to calling plan rules for calls made or received with at least one telephone comprising the steps of providing:

a call timer; and a call time controller, wherein, said call time controller is adapted for a call made or received with the telephone, said call having a duration, said time controller is adapted for:

(a) receiving a set of charge parameters and time information, wherein the set of charge parameters are defined at least in part by a set of calling plan rules transmitted from a server or other computing device to the call time controller in response to selection of an icon or other identifier representing the set of calling plan rules, (b) identifying a first charge parameter from said set of charge parameters that pertains to a first period of said duration by use of said time information, (c) causing said call timer to accumulate time over said first period, (d) receiving a predetermined time corresponding to the time of termination of a billing period, and (e) resetting said call timer at said predetermined time according to said time information.

28. The method of claim 27, wherein said call time controller is further adapted for computing an accumulated charge for said call by integrating said first charge parameter over said first period.

29. The method of claim 28, further comprising providing a display supported by a housing for the telephone, for displaying the computed accumulated charge.

30. The method of claim 27, wherein said call time controller is further adapted for identifying a second charge parameter from said set that pertains to a second period of said duration by use of said time information, and causing said call timer to accumulate time over said second period.

31. The method of claim 30, wherein said call time controller is further adapted for computing an accumulated charge for said call by integrating said first charge parameter over said first period, integrating said second charge parameter over said second period, and adding the result.

32. The method of claim 31, further comprising providing a display supported by a housing for the telephone, for displaying the computed accumulated charge.

33. The method of claim 32, wherein said call timer is apportioned into first and second call time bins, wherein said call time controller causes said first call timer bin to accumulate time over said first period and not said second period, and wherein said call timer controller causes said second call timer bin to accumulate time over said second period and not said first period.

34. A machine readable medium embodying a program of instructions for to be performed by a machine for automatically tracking charges according to calling plan rules for calls made or received with at least one telephone, said instructions comprising the steps of providing:

a call timer; and a call time controller, wherein, said call time controller is adapted for a call made or received with the telephone, said call having a duration, said time controller is adapted for:

(a) receiving a set of charge parameters and time information, wherein the set of charge parameters are defined at least in part by a set of calling plan rules transmitted from a server or other computing device to the call time controller in response to selection of an icon or other identifier representing the set of calling plan rules, (b) identifying a first charge parameter from said set of charge parameters that pertains to a first period of said duration by use of said time information, (c) causing said call timer to accumulate time over said first period, (d) receiving a predetermined time corresponding to the time of termination of a billing period, and (e) resetting said call timer at said predetermined time according to said time information.

35. The machine readable medium of claim 34, wherein said call time controller is further adapted for computing an accumulated charge for said call by integrating said first charge parameter over said first period.

36. The machine readable medium of claim 35, further comprising providing a display supported by a housing for the telephone, for displaying the computed accumulated charge.

37. The machine readable medium of claim 34, wherein said call time controller is further adapted for identifying a second charge parameter from said set that pertains to a second period of said duration by use of said time information, and causing said call timer to accumulate time over said second period.

38. The machine readable medium of claim 37, wherein said call time controller is further adapted for computing an accumulated charge for said call by integrating said first charge parameter over said first period, integrating said second charge parameter over said second period, and adding the result.

39. The machine readable medium of claim 38, further comprising providing a display supported by a housing for the telephone, for displaying the computed accumulated charge.

40. The machine readable medium of claim 39, wherein said call timer is apportioned into first and second call time bins, wherein said call time controller causes said first call timer bin to accumulate time over said first period and not said second period, and wherein said call timer controller causes said second call timer bin to accumulate time over said second period and not said first period.

41. A telephone providing automatic tracking of calling plan charges, comprising a call time controller adapted for receiving and storing a set of calling plan rules and configuration data, wherein the set of calling plan rules are transmitted from a server or other computing device to the telephone in response to selection of an icon or other identifier representing the set of calling plan rules.

42. The telephone of claim 41, wherein said calling plan rules are transferred to the call time controller using a telephone communication method.

43. The telephone of claim 42, wherein said telephone communication method is a short message service protocol.

44. The telephone of claim 42, wherein said telephone communication method comprises retrieving data from a web server.

45. The telephone of claim 41, further comprising a data port, wherein said calling plan rules are transferred to the call time controller using said data port.

46. The telephone of claim 41, further comprising a key pad, wherein said configuration data is entered using said keypad.

47. The telephone of claim 41, wherein said calling plan rules are applied with respect the telephone usage of a second telephone, and wherein said second telephone usage data is transferred from said second telephone to the telephone.

48. The telephone of claim 47, said second telephone usage data is transferred from said second telephone to the telephone through an intermediary, wherein said intermediary is a web server.

* * * * *